(12) United States Patent
Xu et al.

(10) Patent No.: US 6,446,995 B1
(45) Date of Patent: Sep. 10, 2002

(54) BICYCLE WITH BEVEL GEAR DRIVE FOR CHILDREN

(75) Inventors: Cai-xi Xu; Jia-kuan Zhu, both of Shanghai (CN)

(73) Assignee: Shanghai Baoqi Bicycle Co., Ltd., Shanghai (CN)

( * ) Notice: Subject to any disclaimer, the term of this patent is extended or adjusted under 35 U.S.C. 154(b) by 0 days.

(21) Appl. No.: 09/513,278

(22) Filed: Feb. 24, 2000

(30) Foreign Application Priority Data

Jun. 4, 1999 (CN) .......................................... 99226870

(51) Int. Cl.⁷ ................................................ B62M 1/06
(52) U.S. Cl. .......................................... 280/260; 74/417
(58) Field of Search ................................ 280/259, 260, 280/210; 74/416, 417

(56) References Cited

U.S. PATENT DOCUMENTS

| 572,208 A | * | 12/1896 | Lorenz | |
|---|---|---|---|---|
| 616,571 A | * | 12/1898 | Harden | |
| 821,340 A | * | 5/1906 | Copeland | |
| 3,831,716 A | * | 8/1974 | Orozco | 188/24 |
| 4,638,890 A | * | 1/1987 | Lohman | 188/24.17 |
| 4,943,077 A | * | 7/1990 | Lin et al. | 280/260 |
| 5,482,306 A | * | 1/1996 | Hsu | 280/260 |
| 5,852,948 A | * | 12/1998 | Chang | 74/417 |
| 5,967,537 A | * | 10/1999 | Chang | 280/259 |
| 6,012,538 A | * | 1/2000 | Sonobe et al. | 180/220 |

FOREIGN PATENT DOCUMENTS

| CN | 87204156 U | 2/1988 |
|---|---|---|
| CN | 88202769 U | 12/1988 |
| CN | 2034960 U | 3/1989 |
| CN | 2051965 U | 1/1990 |
| CN | 2054010 U | 3/1990 |
| CN | 2068079 U | 12/1990 |
| CN | 2084033 U | 9/1991 |
| CN | 2089911 U | 12/1991 |
| CN | 90224792.1 | 12/1991 |
| CN | 2177673 Y | 9/1994 |

* cited by examiner

Primary Examiner—Avraham Lerner
(74) Attorney, Agent, or Firm—Merchant & Gould P.C.

(57) ABSTRACT

A children's bicycle with a bevel gear driving device that includes a pedal intermediate axle, characterized in that the pedal intermediate axle is connected with a drive bevel gear, which drives a connecting rod having bevel gears on both ends thereof, that the bevel gear on the other end of the connecting rod drives the rear wheel bevel gear, and that protecting hoods are provided over the driving bevel gear, the connecting rod with bevel gears, and the rear wheel bevel gear. The driving device avoids the problem of chain falling-off and allows safer use.

2 Claims, 4 Drawing Sheets

BICYCLE WITH BEVEL GEAR DRIVE FOR CHILDREN

FIELD OF THE INVENTION

The present invention relates to a bicycle for children, particularly relates to a bicycle with bevel gear drive for children.

BACKGROUND OF THE INVENTION

At present, in the field of bicycles for children, the wheel is usually driven by a chain drive; due to naivete and curiosity, children are likely to put their hands into sprockets, chain wheels or other driving members, causing injury. In addition, as sprockets and other driving members rely on lubricant for lubrication, the greasy dirt will easily stain clothes during use.

More recently, there are chain-free bicycles. For instance, Chinese patent No. 99224792.1 discloses an improved chain-free bicycle driving structure, which is a common chain-free drive single axle structure with a foot brake on the rear wheel axle. However conventional bicycles with chain-free driving devices also have the problems in that the bevel gears need lubricant for lubrication, and that the lubricant will easily stain clothes and other articles, and that the driving components (particularly bevel gears at rear wheel axle portion) have to be specially custom-made and lack interchangeability with bicycle components of other kinds. Since the drive bevel gears of bicycles of this kind are all arranged inside the intermediate axle, their maintenance is relatively difficult and they need relatively larger torque to be driven, while children have less foot strength and thus need greater effort to pedal and there is no demand on riding speed for children's bicycles.

In addition, the U.S. Pat. No. 5,299,819 also discloses a chain-free drive bicycle, in which the problems also exist in that it needs lubricant for lubrication, easily stains clothes, and is not adapted to children, who have less foot strength.

THE OBJECT OF THE INVENTION

The object of the present invention is to provide a bicycle which is clean and safe for use, convenient for maintenance, of good interchangeability of drive parts, and adapted to children's use.

SUMMARY OF THE INVENTION

The basic concept of the present invention is to use bevel gear drive to replace chain drive. Since children have less foot strength, there is less demand on riding speed for children's bicycle; under the same torque, to increase the diameter of bevel gears can reduce the demand for chileren foot strength and bevel gear sustaining ability, and the bevel gears can use high-strength nylon to replace metallic parts; at the same time, the lubricating function possessed by high-strength nylon itself is utilized to lower noise and prevent lubricant from staining clothes. The drive components have good interchangeability with existing drive components, thereby facilitating manufacture and maintenance.

In order to arrive at the above-mentioned inventive objectives, the present invention adopts a technical scheme in which a bicycle for children with a bevel gear driving device comprises a bicycle body, a wheel, a handlebar, a driving device, and a braking device; the pedal intermediate axle of the driving device is connected with drive bevel gear, the drive bevel gear meshes with a bevel gear of the intermediate axle part on the drive axle, a bevel gear on the rear drive axle part meshes with a bevel gear on the rear wheel axle, outside the meshing portion of each bevel gear is provided a protecting hood, which is made of high-strength nylon, the drive bevel gear is provided outside the pedal intermediate axle, the rear wheel axle has a foot braking device. Inside the bevel gear on said rear wheel axle is provided an insert made of rigid material, and there are positioning protrusions on the insert. On the rear wheel axle spindle are provided concave slots corresponding to those protrusions. Between the insert and bevel gear inner wall is formed a boss shape. Said insert is fixed by a spring ring and screw thread at its outside.

The advantages of the present invention are that the driving device adopts a chain-free drive, that at the mesh portion of each bevel gear is provided a hood, that the children's bicycle can prevent children from putting their hands into the driving device to ensure safer use; since every bevel gear is made by using high-strength nylon and nylon itself has good lubricating function needless of adding lubricant, it can lower noise, prevent clothes staining, and allow cleaner use; as the drive bevel gear is provided outside the pedal intermediate axle, the drive bevel gear can be made larger in diameter, and the rear wheel axle has a foot braking device, so as to adapt to children's characteristic of less foot strength and at the same time allow the strength of nylon material to satisfy design requirement. Since inside the bevel gear on the rear wheel axle is provided an insert made of rigid material, the rear wheel axle of a child's bicycle can be retrofitted directly from existing chain type rear wheel with foot brake to allow the driving device to have a better interchangeability. There are positioning protrusions on the insert, and corresponding concave slots on the rear wheel axle nave, and between the insert and bevel gear inner wall is formed a boss shape to make the rear wheel axle part more convenient both to installation and maintenance.

DETAILED DESCRIPTION OF A PREFERRED EMBODIMENT

Figure 1:
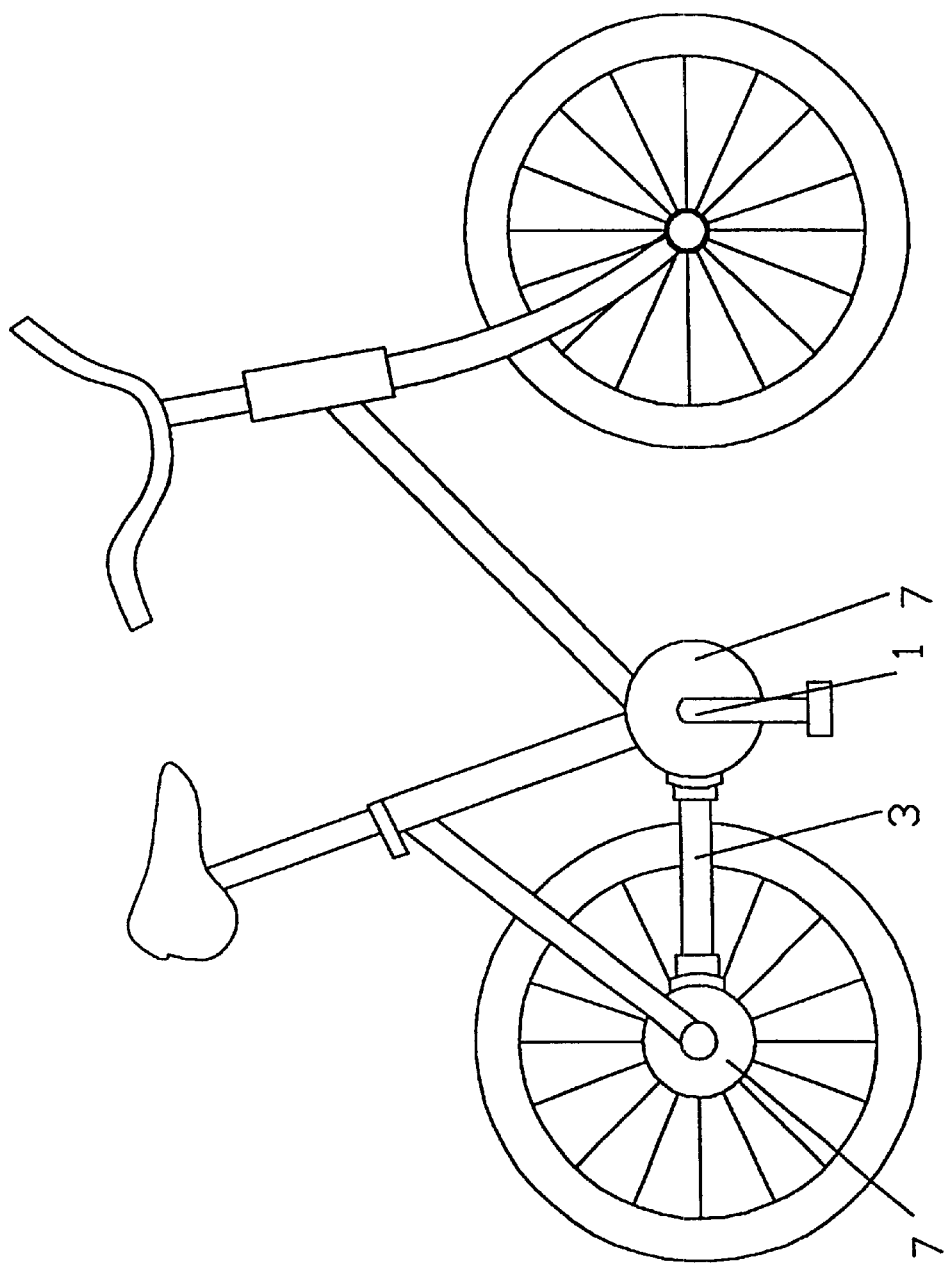
FIG. 1 is a schematic view of a children bicycle with bevel gear driving device of the present invention.

A preferred embodiment of the present invention in combination with drawings is described in detail as follows.

Refer ring to FIGS. 1, 2, 3, 4 and 5, the designations of drawings are as follows:

Intermediate axle 1,

Drive bevel gear 2,

Drive axle 3,

Bevel gear of intermediate axle portion 4,

Bevel gear of drive axle rear axle portion 5,

Bevel gear on rear wheel axle 6,

Hood 7,

Insert 8,

Protrusions 9,

Spring ring 10.

FIG. 1 shows schematically the overall arrangement of the present invention, a chain-free driving device is provided at the place where the chain drive of the original bicycle is.

Figure 2:
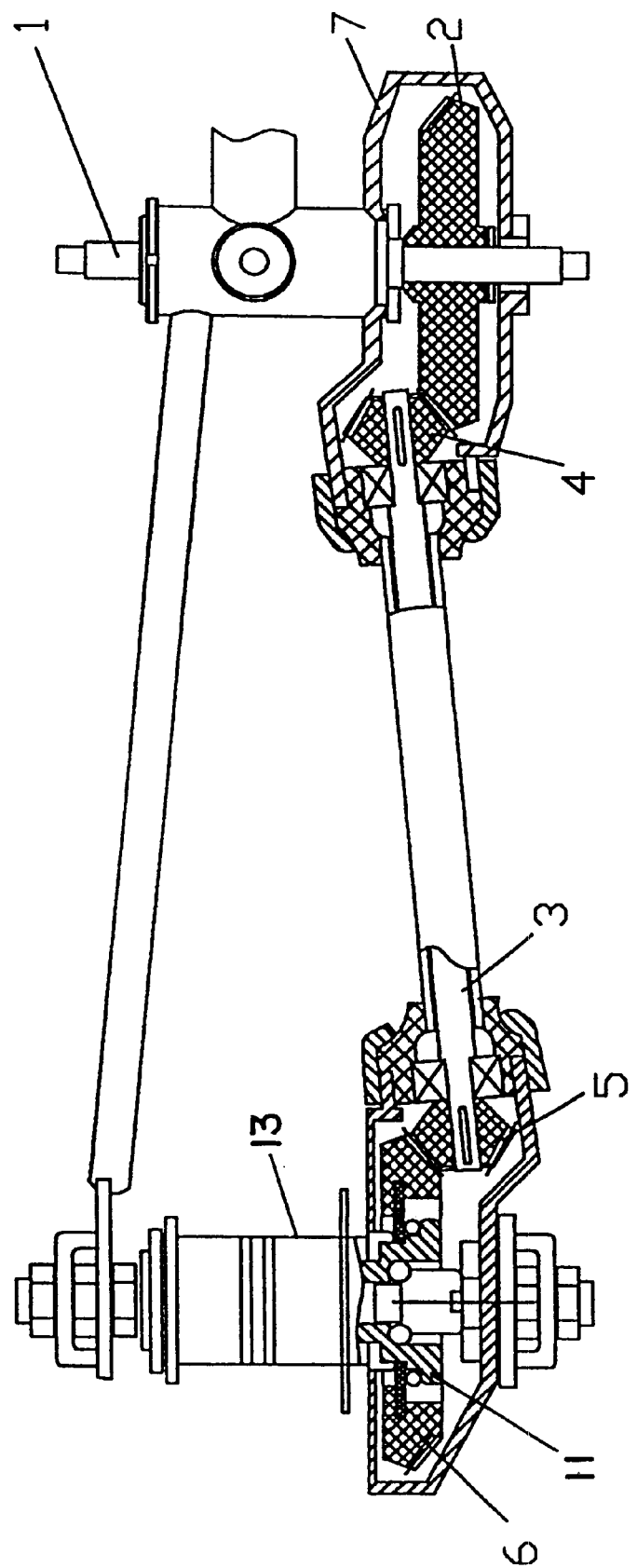
FIG. 2 is a schematic view of a children bicycle with bevel gear driving device of the present invention.
Figure 3:
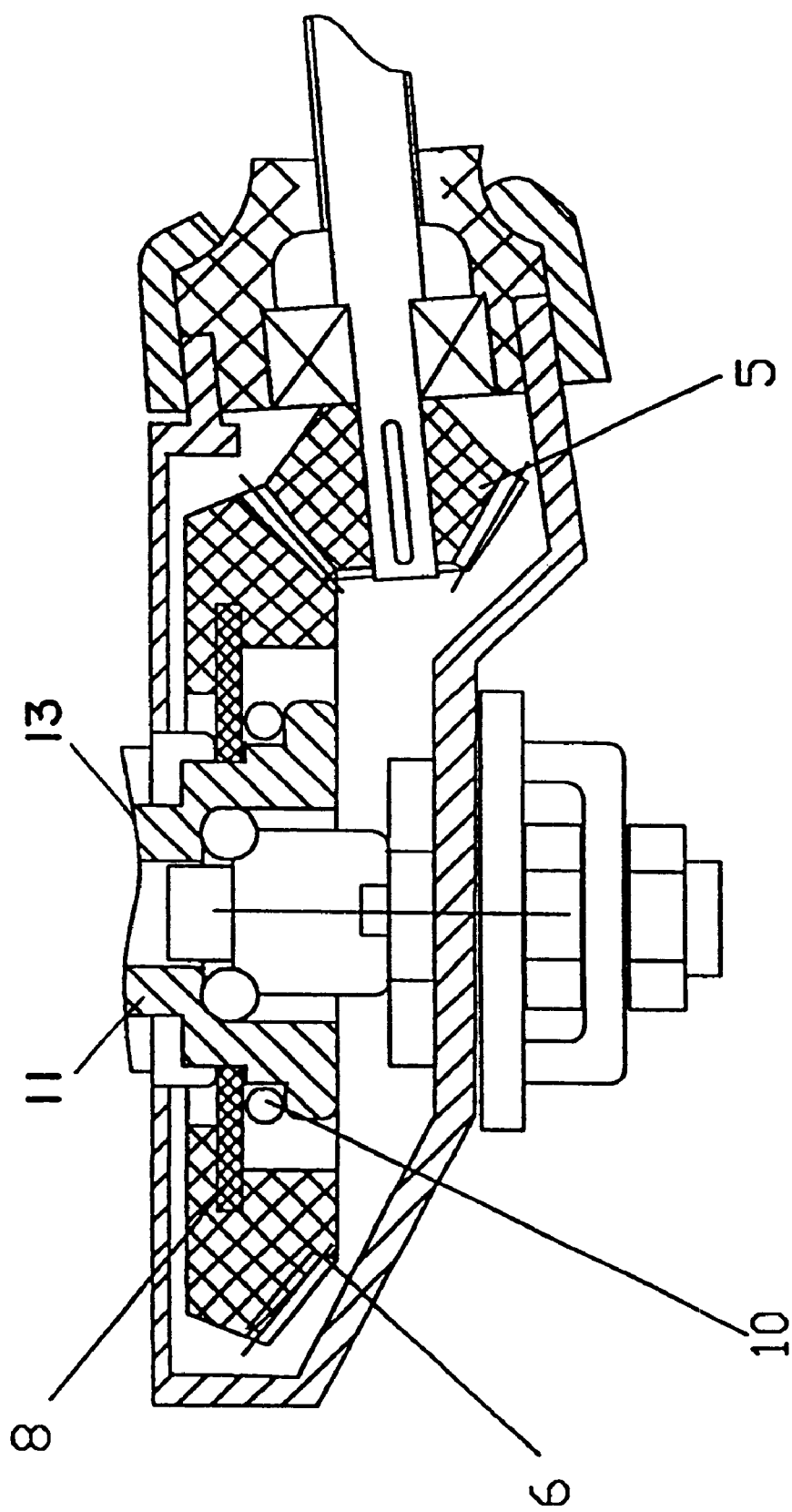
FIG. 3 is a sectional view at the rear wheel axle of the present invention.

FIGS. 2 and 3 show a schematic view of a driving device and sectional view at a rear wheel axle of the present invention. The pedal intermediate axle 1 of the driving device is connected with a drive bevel gear 2. The drive bevel gear 2 meshes with a bevel gear 4 of the intermediate axle portion on a drive axle 3. Since the bevel drive gear 2 is provided outside the pedal intermediate axle 1, the diameter of the drive bevel gear can be made larger to lower the demand of children foot strength and bevel gear sustaining ability. The bevel gear 5 of the rear drive axle portion meshes with a bevel gear 6 on the rear wheel axle. The outside of each bevel gear is provided with a hood to prevent children from putting a hand into the driving device and simultaneously to prevent the bevel gears from pollution by dust to affect drive performance. Since children have less foot strength, the braking device 13 uses a rear wheel axle foot pedal mechanism. Each bevel gear in the drawings is made of high-strength nylon, which has good lubricating function itself and does not need any lubricant and can lower noise and prevent clothes from staining.

Figure 4:
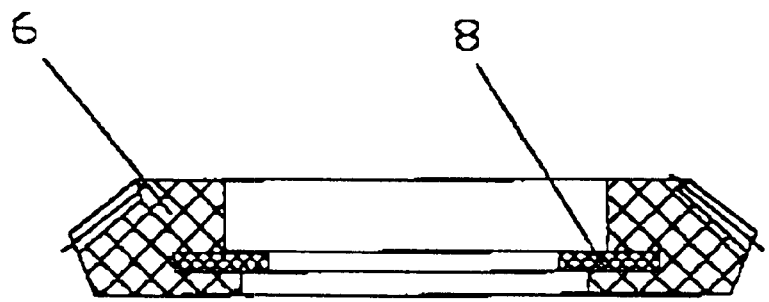
FIG. 4 is a sectional view of a bevel gear and insert at the rear wheel axle of the present invention.
Figure 5:
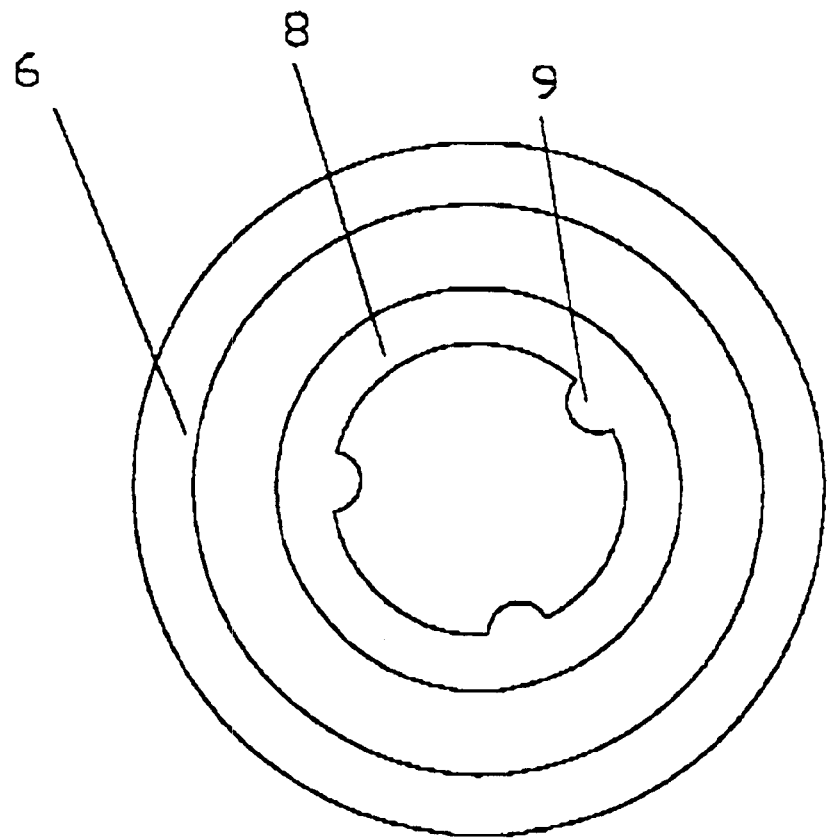
FIG. 5 is a top view of a bevel gear and insert at the rear wheel axle of the present invention.

FIGS. 4 and 5 show schematic views of a bevel gear and an insert at the rear axle of the present invention. Inside the bevel gear 6 on the rear wheel axle is provided an insert 8 made of rigid material. On the insert 8 are provided positioning protrusions 9. On the rear wheel axle nave 11 are provided concave slots corresponding to positioning protrusions 9, so as to facilitate assembling the rear wheel axle nave 11 with bevel gears and enable the meshing angle between two meshing bevel gears. Between the insert and inner wall of the bevel gear is formed a boss. The outside of the insert is fixed by a spring ring 10 and a screw thread. The rear wheel axle of the children bicycle can be retrofitted directly from the existing chain type rear wheel axle with foot brake, allowing the driving device to have good interchangeability and facilitating the installation and maintenance of the rear wheel axle portion.

The description of the above embodiment is only for illustrating in detail of the present invention, and the scope and claims, etc., are not limited thereby.

What is claimed is:

1. A bicycle with a bevel gear driving device for children, comprising a bicycle body, a wheel, a handlebar, a driving device, a braking device, including: a pedal intermediate axle of the driving device being connected with a drive bevel gear, the drive bevel gear meshes with a bevel gear of an intermediate axle portion of a drive axle, a bevel gear of a rear axle portion of the drive axle meshes with a bevel gear on a rear wheel axle, an outside of a meshing portion of each bevel gear is provided with a hood, each bevel gear is made of high-strength nylon, the drive bevel gear is provided outside the pedal intermediate axle, and the rear wheel axle has a foot braking device; and an insert made of rigid material is provided inside the bevel gear on said rear wheel axle, positioning protrusions are provided on the insert, concave slots corresponding to those positioning protrusions are provided on the rear wheel axle nave, and a boss-shaped portion is formed between the insert and bevel gear inner wall.

2. The children's bicycle according to claim 1, wherein an outside of said insert is fixed by a spring ring and screw thread.

* * * * *